(12) United States Patent
Sun et al.

(10) Patent No.: US 11,476,991 B2
(45) Date of Patent: Oct. 18, 2022

(54) DEMODULATION REFERENCE SIGNAL TRANSMISSION METHOD, NETWORK DEVICE AND COMPUTER-READABLE STORAGE MEDIUM

(71) Applicant: VIVO MOBILE COMMUNICATION CO., LTD., Chang'an Dongguan (CN)

(72) Inventors: Xiaodong Sun, Chang'an Dongguan (CN); Xueming Pan, Chang'an Dongguan (CN); Lei Jiang, Chang'an Dongguan (CN); Yu Ding, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 190 days.

(21) Appl. No.: 16/635,109

(22) PCT Filed: Jul. 24, 2018

(86) PCT No.: PCT/CN2018/096804
§ 371 (c)(1),
(2) Date: Jan. 29, 2020

(87) PCT Pub. No.: WO2019/024711
PCT Pub. Date: Feb. 7, 2019

(65) Prior Publication Data
US 2020/0220702 A1 Jul. 9, 2020

(30) Foreign Application Priority Data
Aug. 3, 2017 (CN) .......................... 201710657551.9

(51) Int. Cl.
*H04L 5/00* (2006.01)
*H04W 72/04* (2009.01)
(Continued)

(52) U.S. Cl.
CPC ....... *H04L 5/0051* (2013.01); *H04W 72/0446* (2013.01); *H04W 72/0453* (2013.01); *H04W 72/1263* (2013.01); *H04L 5/10* (2013.01)

(58) Field of Classification Search
CPC ...................................................... H04L 5/0051
See application file for complete search history.

(56) References Cited

U.S. PATENT DOCUMENTS

2017/0171842 A1* 6/2017 You ........................ H04L 5/0023
2018/0279291 A1* 9/2018 Tiirola .............. H04W 72/0413
(Continued)

FOREIGN PATENT DOCUMENTS

| CN | 106604405 A | 4/2017 |
|---|---|---|
| CN | 106788926 A | 5/2017 |

OTHER PUBLICATIONS

European Search Report Application No. 18840905.6; dated Jul. 9, 2020.
(Continued)

*Primary Examiner* — Jason E Mattis
(74) *Attorney, Agent, or Firm* — von Briesen & Roper, s.c.

(57) ABSTRACT

A DMRS transmission method, a network device, and a computer-readable storage medium are provided. The DMRS transmission method includes: configuring a DMRS for a service channel within a mini-slot; mapping at least one antenna port corresponding to the DMRS for the service channel to a time-domain transmission resource and a frequency-domain transmission resource corresponding to a DMRS for a control channel within the mini-slot; and transmitting the DMRS for the service channel on the time-domain transmission resource and the frequency-domain transmission resource.

12 Claims, 5 Drawing Sheets

(51) Int. Cl.
*H04W 72/12* (2009.01)
*H04L 5/10* (2006.01)

(56) References Cited

U.S. PATENT DOCUMENTS

2018/0316534 A1* 11/2018 Shin ..................... H04L 5/0048
2020/0119880 A1* 4/2020 Liu ..................... H04L 5/0051

OTHER PUBLICATIONS

International Search Report & Written Opinion related to Application No. PCT/CN2018/096804; dated Sep. 21, 2018.
ETRI; "DMRS design for NR-PDCCH", 3GPP TSG RAN WG1 NR Ad-Hoc#2, R1-1710615, Qingdao, China, Jun. 27-Jun. 30, 2017.
LG Electronics; "Discussion on sPDSCH for latency reduction", 3GPP TSG RAN WG1 Meeting #86bis, R1-1609215, Lisbon, Portugal, Oct. 10-Oct. 14, 2016.
VIVO; "NR-PDCCH Control Resource Set", 3GPP TSG RAN WG1 AH_NR Meeting, R1-1700277, Spokane, USA, Jan. 16-Jan. 20, 2017.
Nokia, Alcatel-Lucent Shanghai Bell; "On scheduling of mini-slots within slots", 3GPP TSG RAN WG1#89, R1-1708531, Hangzhou, P.R. China, May 15-May 19, 2017.
Nokia, Alcatel-Lucent Shanghai Bell; "On design of DL DM-RS for NR physical data channels", 3GPP TSG RAN WG1 NR Ad-Hoc#, R1-1711305, Qingdao, P.R. China, Jun. 27-Jun. 30, 2017.

* cited by examiner

DEMODULATION REFERENCE SIGNAL TRANSMISSION METHOD, NETWORK DEVICE AND COMPUTER-READABLE STORAGE MEDIUM

CROSS-REFERENCE TO RELATED APPLICATION

The present application is the U.S. national phase of PCT Application No. PCT/CN2018/096804 filed on Jul. 24, 2018, which claims a priority of the Chinese patent application No. 201710657551.9 filed in China on Aug. 3, 2017, which is incorporated herein by reference in its entirety.

TECHNICAL FIELD

The present disclosure relates to the field of communication technology, in particular to a Demodulation Reference Signal (DMRS) transmission method, a network device and a computer-readable storage medium.

BACKGROUND

In a conventional $4^{th}$-Generation (4G) mobile communication system, a DMRS is mainly used for channel estimation and demodulation of a service channel, a control channel and a broadcast channel, and a DMRS pattern is located at a fixed position in a time domain and a frequency domain. Especially, in order to maintain backward compatibility, the DMRS for the service channel within a normal Transmission Time Interval (TTI) is multiplexed by the service channel within a short TTI.

In a coming $5^{th}$-Generation (5G) mobile communication system (also called as New Radio (NR) system), in order to support various services such as an enhanced Mobile Broadband (eMBB) service and an Ultra Reliable & Low Latency Communication (URLLC) service, a front-loaded DMRS has been introduced. The front-loaded DMRS includes two configurable patterns, and its main purpose is to achieve the demodulation as soon as possible. In addition, in order to be adapted to various application scenarios, an additional DMRS has been defined. The number of ports for the additional DMRS may be different from the number of ports for the front-loaded DMRS. A time-domain density of the additional DMRS may be dynamically configured in accordance with the requirements in each scenario. For example, in the case of a low speed in a high-speed movement scenario, the time-domain density of the additional DMRS may increase.

In the NR system, there is a scenario where a time length of a time-domain transmission unit is smaller than a normal slot, e.g., a mini-slot scenario. In the related art, there is currently no DMRS configuration and transmission method in the mini-slot scenario.

SUMMARY

In a first aspect, the present disclosure provides in some embodiments a DMRS transmission method for a network device, including: configuring a DMRS for a service channel within a mini-slot; mapping at least one antenna port corresponding to the DMRS for the service channel to a time-domain transmission resource and a frequency-domain transmission resource corresponding to a DMRS for a control channel within the mini-slot; and transmitting the DMRS for the service channel on the time-domain transmission resource and the frequency-domain transmission resource.

In a second aspect, the present disclosure provides in some embodiments a network device, including: a first configuration module configured to configure a DMRS for a service channel within a mini-slot; a first mapping module configured to map at least one antenna port corresponding to the DMRS for the service channel to a time-domain transmission resource and a frequency-domain transmission resource corresponding to a DMRS for a control channel within the mini-slot; and a first transmission module configured to transmit the DMRS for the service channel on the time-domain transmission resource and the frequency-domain transmission resource.

In a third aspect, the present disclosure provides in some embodiments a network device, including a processor, a memory, and a program being stored in the memory and capable of being executed by the processor. The processor is configured to execute the program so as to implement the above-mentioned DMRS transmission method in the first aspect.

In a fourth aspect, the present disclosure provides in some embodiments a computer-readable storage medium storing therein a program. The program is executed by a processor so as to implement the above-mentioned DMRS transmission method in the first aspect.

In a fifth aspect, the present disclosure provides in some embodiments a DMRS transmission method for a network device, including: configuring a DMRS for a service channel within a mini-slot; mapping, to a transmission resource of M symbols being offset in time domain relative to a time-domain transmission resource corresponding to a control channel within the mini-slot, at least one antenna port corresponding to the DMRS for the service channel, M being an integer greater than or equal to 1; and transmitting the DMRS for the service channel on the transmission resource.

In a sixth aspect, the present disclosure further provides in some embodiments a network device, including: a second configuration module configured to configure a DMRS for a service channel within a mini-slot; a second mapping module configured to map, to a transmission resource of M symbols being offset in time domain relative to a time-domain transmission resource corresponding to a control channel within the mini-slot, at least one antenna port corresponding to the DMRS for the service channel, M being an integer greater than or equal to 1; and The DMRS for the service channel is transmitted on the transmission resource.

In a seventh aspect, the present disclosure provides in some embodiments a network device, including a processor, a memory, and a program being stored in the memory and capable of being executed by the processor. The processor is configured to execute the program so as to implement the above-mentioned DMRS transmission method in the fifth aspect.

In an eighth aspect, the present disclosure provides in some embodiments a computer-readable storage medium storing therein a program. The program is executed by a processor so as to implement the above-mentioned DMRS transmission method in the fifth aspect.

In a ninth aspect, the present disclosure provides in some embodiments a DMRS transmission method for a network device, including: configuring a corresponding DMRS for a service channel in accordance with a start position of a mini-slot where the service channel for the same User Equipment (UE) is located; and transmitting the DMRS for the service channel to the UE.

In an tenth aspect, the present disclosure provides in some embodiments a network device, including: a third configuration module configured to configure a corresponding DMRS for a service channel in accordance with a start position of a mini-slot where the service channel for a same UE is located; and a second transmission module configured to transmit the DMRS for the service channel to the UE.

In an eleventh aspect, the present disclosure provides in some embodiments a network device, including a processor, a memory, and a program being stored in the memory and capable of being executed by the processor. The processor is configured to execute the program so as to implement the above-mentioned DMRS transmission method in the ninth aspect.

In a twelfth aspect, the present disclosure provides in some embodiments a computer-readable storage medium storing therein a program. The program is executed by a processor so as to implement the above-mentioned DMRS transmission method in the ninth aspect.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

Figure 1:
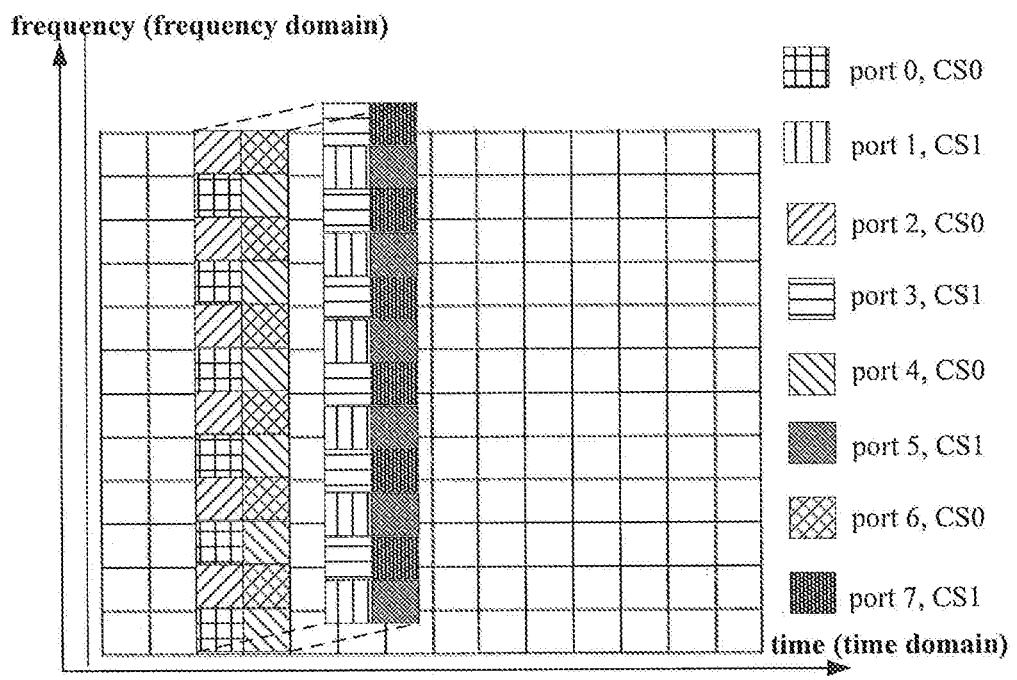
FIG. 1 is a schematic view showing a DMRS pattern of a configuration type 1 according to an embodiment of the present disclosure.

The present disclosure will be described hereinafter in conjunction with the drawings and embodiments. Although the drawings show embodiments of the present disclosure, a person skilled in the art understands that the present disclosure may be implemented in various manners instead of being limited to the embodiments described herein. Actually, the embodiments are provided so as to facilitate the understanding of the scope of the present disclosure, and convey the scope of the present disclosure to a person skilled in the art in a complete manner.

Such words as "first" and "second" involved in the specification and the appended claims are merely used to differentiate different objects rather than to represent any specific order. It should be appreciated that, the data used in this way may be replaced with each other in an appropriate manner, so as to implement the embodiments in an order other than that shown in the drawings or described in the specification. In addition, such terms as "include" or "including" or any other variations involved in the present disclosure intend to provide non-exclusive coverage, for example, a procedure, method, system, product or device including a series of steps or units may not be limited to the steps or units explicitly listed herein. Instead, it may also include a step or unit not explicitly listed herein, or may include a step or unit being inherent to the procedure, method, product or device.

In an NR system, within one slot, a position of a front-loaded DMRS is fixed and independent of a position of a time-domain symbol (Orthogonal Frequency Division Multiplexing (OFDM) symbol) occupied by a first Physical Downlink Shared Channel (PDSCH). There are two configuration types for the front-loaded DMRS, i.e., a configuration type 1 and a configuration type 2.

Specifically, the configuration type 1 may be: 1 symbol, Comb2+CS2, which supports at most four antenna ports; or 2 symbols, Comb2+CS2+TD-OCC, which supports at most eight antenna ports. The configuration type 2 may be: 1 symbol, 2-FD-OCC (consecutive REs in a frequency domain), which supports at most six antenna ports; or 2 symbols, 2-FD-OCC (consecutive REs in a frequency domain)+TD-OCC, which supports at most twelve antenna ports.

FIG. 1 shows a DMRS pattern of a configuration type 1. A DMRS mapped to one OFDM symbol may support at most four antenna ports. One OFDM symbol may include two groups of comb resources, and each group of comb resources may correspond to one antenna port. Each group of comb resources may carry two groups of cyclically-shifted sequence codes, and one group of sequence codes may correspond to one antenna port. Hence, the DMRS mapped to one OFDM symbol may support at most four antenna ports, and the DMRS mapped to two OFDM symbols may support at most eight antenna ports.

Figure 2:
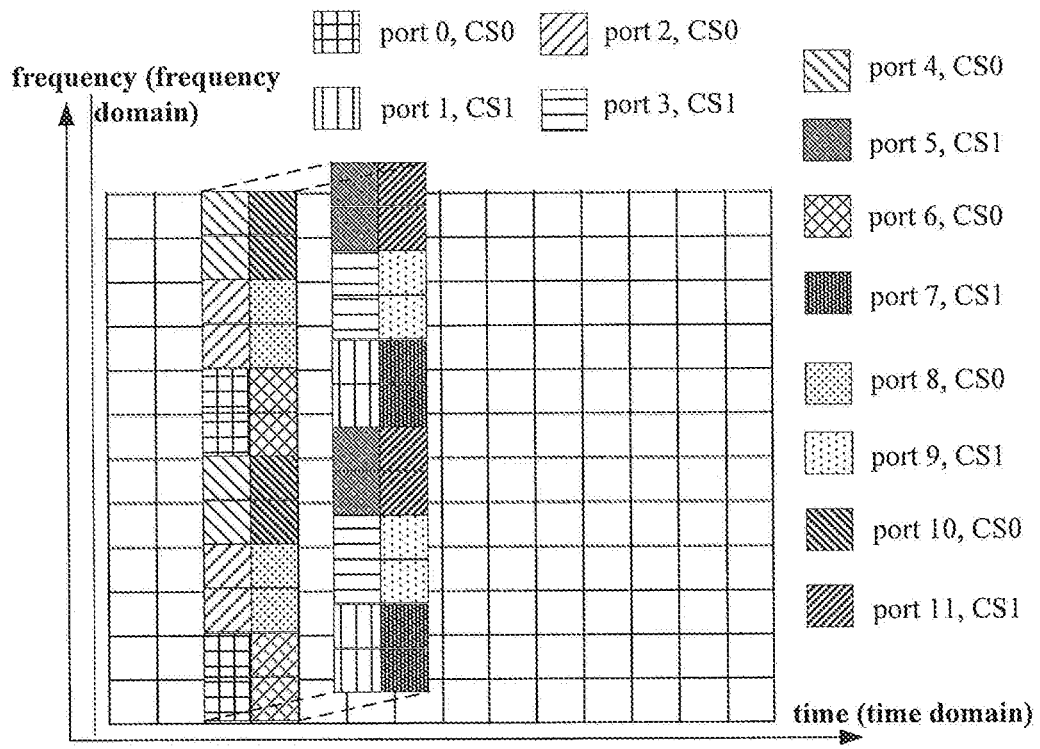
FIG. 2 is a schematic view showing the DMRS pattern of a configuration type 2 according to an embodiment of the present disclosure.

FIG. 2 shows a DMRS pattern of a configuration type 2. The DMRS mapped to one OFDM symbol may support at most six antenna ports. At most three groups of DMRS patterns with consecutive REs may be mapped to one OFDM symbol, and each group of DMRS patterns may correspond to one antenna port. Each group of DMRS patterns may carry two groups of orthogonal codes, and each group of orthogonal codes may correspond to one antenna port. Hence, the DMRS mapped to one OFDM symbol may support at most six antenna ports, and the DMRS mapped to two OFDM symbols may support at most twelve antenna ports.

Further, a position of a first DMRS for the PDSCH may be fixed on a third and/or fourth OFDM symbols within a normal slot, or on an OFDM symbol for scheduling data within a first non-normal slot. When both the normal slot and the non-normal slot have been configured by a network device for a UE, the position of the first DMRS may be switched between the third OFDM symbol and/or fourth OFDM symbol and the first symbol for scheduling the data.

The design of the front-loaded DMRS in a normal slot scenario in the coming NR system has been given hereinabove. However, in the NR system, there is also a scenario where a time length of a time-domain transmission unit is smaller than the normal slot, e.g., a mini-slot scenario. In the related art, there is currently no DMRS configuration and transmission method in the mini-slot scenario.

An object of the present disclosure is to provide a DMRS transmission method, a network device and a computer-readable storage medium, so as to solve the problems in the related art where there is no DMRS configuration and transmission method in the mini-slot scenario in the NR system.

First Embodiment

Figure 3:
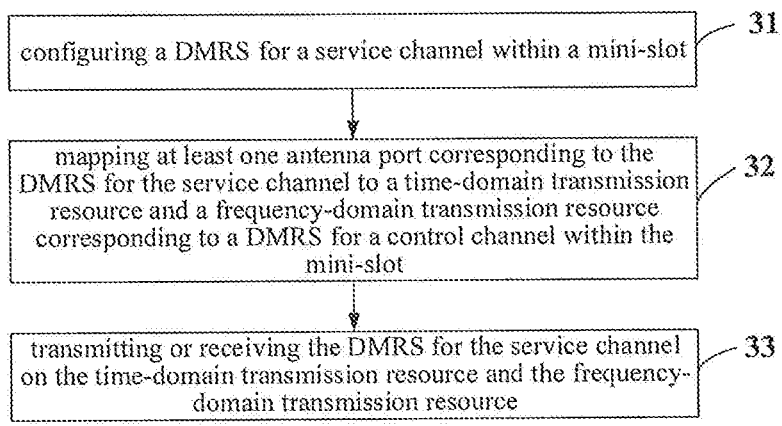
FIG. 3 is a flow chart of a DMRS transmission method according to a first embodiment of the present disclosure.

The present disclosure provides in this embodiment a DMRS transmission method for a network device which, as shown in FIG. 3, includes Steps 31 to 33.

Step 31: configuring a DMRS for a service channel within a mini-slot.

In the NR system, a normal slot (also called as slot) has a length of 7 or 14 time-domain symbols (also called OFDM symbols). A slot having a length shorter than the normal slot may be called as short slot or mini-slot. In a mini-slot transmission scenario, a control channel and a service channel may occur in one or more time-domain symbols concurrently, and at this time, the network device needs to configure the DMRSs for the control channel and the service channel respectively.

Step 32: mapping at least one antenna port corresponding to the DMRS for the service channel to a time-domain transmission resource and a frequency-domain transmission resource corresponding to a DMRS for a control channel within the mini-slot.

In this embodiment, in order to improve the resource utilization, the network device may map the at least one antenna port corresponding to the DMRS for the service channel to the transmission resources corresponding to the DMRS for the control channel. Here, the transmission resources mainly include the time-domain transmission resource and the frequency-domain transmission resource. In this way, when detecting the DMRS, a UE may determine, through decoding, whether the DMRS transmitted on the transmission resources is for the control channel or the service channel. In other words, the network device may multiplex a part of the DMRS ports for the service channel to the transmission resources for the control channel, so as to improve the resource utilization of the control channel, and rapidly demodulate the service channel.

The service channel may include a Physical Uplink Shared Channel (PUSCH) or a Physical Downlink Shared Channel (PDSCH). The control channel may include a Physical Uplink Control Channel (PUCCH) or a Physical Downlink Control Channel (PDCCH). In other words, the network device may multiplex a part of the DMRS ports for the PUSCH to the transmission resources for the PUCCH, and multiplex a part of the DMRS ports for the PDSCH to the transmission resources for the PDCCH, so as to improve the resource utilization, and rapidly demodulate the service channel.

Step 33: transmitting or receiving the DMRS for the service channel on the time-domain transmission resource and the frequency-domain transmission resource.

The network device may multiplex a part of the DMRS ports for the service channel to the transmission resources for the control channel. In other words, the network device may transmit the DMRS for the service channel and the DMRS for the control channel to the UE on the corresponding transmission resources, so that the UE may demodulate the service channel and the control channel in accordance with the corresponding DMRSs.

A configuration procedure of the network device will be described hereinafter in conjunction with the drawings and the specific application scenarios.

Scenario 1: in a mini-slot transmission scenario, when the number of the antenna ports corresponding to the DMRS for the service channel is smaller than or equal to a predetermined value N, same time-frequency-domain resources may be multiplexed by the DMRS for the service channel and the DMRS for the control channel.

To be specific, Step 32 may include, when the number of the antenna ports corresponding to the DMRS for the service channel is smaller than or equal to a predetermined value, mapping all the antenna ports corresponding to the DMRS for the service channel to the time-domain transmission resource and the frequency-domain transmission resource corresponding to the DMRS for the control channel within the mini-slot.

Figure 4:
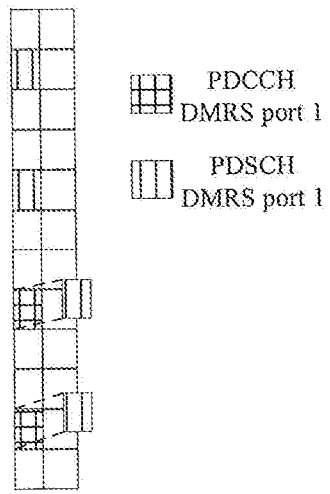
FIG. 4 is a schematic view showing the mapping of resources multiplexed by a DMRS in scenario 1 according to the first embodiment of the present disclosure.

As shown in FIG. 4, it is presumed that two time-domain symbols are occupied by a downlink mini-slot, a part of resources of a first symbol (e.g., a low-frequency portion in figure) are occupied by the control channel, the number of the antenna ports corresponding to the DMRS for the control channel is 1, the other resources are occupied by the service channel, and the number of the antenna ports corresponding to the DMRS for the service channel is 1. When it is defined that the same time-frequency-domain transmission resources are multiplexed by the DMRS for the service channel and the DMRS for the control channel in the case that the number of the antenna ports corresponding to the DMRS for the service channel is smaller than or equal to 2, the network device may map the DMRS for the service channel to the transmission resources corresponding to the DMRS for the control channel. When the same time-frequency-domain resources are multiplexed by the DMRS for the service channel and the DMRS for the control channel, it is able to improve the resource utilization as well as a downlink data transmission rate.

Scenario 2: in the mini-slot transmission scenario, the number of the antenna ports corresponding to the DMRS for the service channel is greater than the predetermined value N, same time-frequency-domain resources may be multiplexed by parts of the DMRS ports for the service channel and the DMRS for the control channel.

Step 32 may include, when the number of the antenna ports corresponding to the DMRS for the service channel is greater than the predetermined value, mapping a first part of the antenna ports corresponding to the DMRS for the service channel to the time-domain transmission resource and the frequency-domain transmission resource corresponding to the DMRS for the control channel within the mini-slot, and mapping, to a transmission resource of M symbols being offset in time domain relative to the time-domain transmission resource corresponding to the control channel within the mini-slot, a second part of the antenna ports corresponding to the DMRS for the service channel.

M may be an integer greater than or equal to 1. The second part of the antenna ports may be antenna ports corresponding to the DMRS for the service channel which overlap the frequency-domain transmission resource corresponding to the DMRS for the control channel, or antenna ports corresponding to the DMRS for the service channel whose number is greater than the predetermined value, or the antenna ports corresponding to the DMRS for the service channel whose number is greater than the predetermined value and which overlap the frequency-domain transmission resource corresponding to the DMRS for the control channel. The first part of the antenna ports is all the antenna ports corresponding to the DMRS for the service channel other than the second part of the antenna ports.

Figure 5:
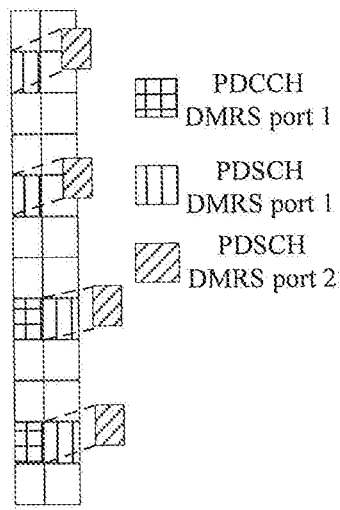
FIG. 5 is a schematic view showing the mapping of the resources multiplexed by the DMRS in scenario 2 according to the first embodiment of the present disclosure.

To be specific, in the mini-slot transmission scenario, when the number of the antenna ports corresponding to the DMRS for the service channel is greater than N, a portion of the DMRS for the service channel overlapping the DMRS for the control channel may be offset backward by M symbols. As shown in FIG. 5, it is presumed that two time-domain symbols are occupied by the downlink mini-slot, a part of resources of a first symbol (e.g., a low-frequency portion in figure) are occupied by the control channel, the number of the antenna ports corresponding to the DMRS for the control channel is 1, the other resources are occupied by the service channel, and the number of the antenna ports corresponding to the DMRS for the service channel is 2. When it is defined that the same time-frequency-domain transmission resources are multiplexed by the DMRS for the service channel and the DMRS for the control channel in the case that the number of the antenna ports corresponding to the DMRS for the service channel is smaller than or equal to 1, it is necessary to enable the part of the antenna ports overlapping the frequency-domain resource corresponding to the DMRS for the control channel to be backward by one symbol, because the number of the antenna ports corresponding to the DMRS for the service channel is 2. In this way, when the time-domain resource is multiplexed by the DMRS for the downlink service channel and the DMRS for the control channel and the frequency-domain resource is offset backward, it is able to improve the resource utilization as well as the downlink data transmission rate.

Figure 6:
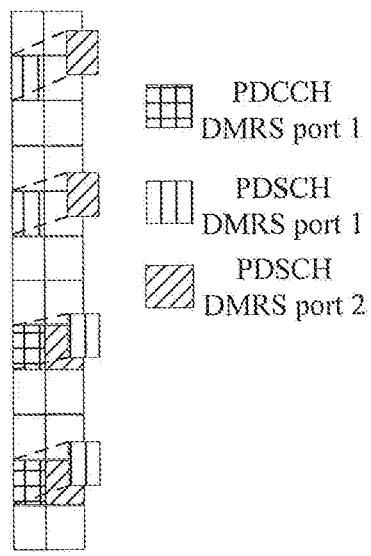
FIG. 6 is another schematic view showing the mapping of the resources multiplexed by the DMRS in scenario 2 according to the first embodiment of the present disclosure.

Further, in the mini-slot transmission scenario, when the number of the antenna ports corresponding to the DMRS for the service channel is greater than N, the same time-frequency-domain resources may be multiplexed by the antenna ports corresponding to the DMRS for the service channel whose number is smaller than N and the DMRS for the control channel, and the other antenna ports corresponding to the DMRS for the service channel may be offset backward by M symbols. As shown in FIG. 6, it is presumed that two time-domain symbols are occupied by the downlink mini-slot, a part of resources of a first symbol (e.g., a low-frequency portion in the figure) are occupied by the control channel, the number of the antenna ports corresponding to the DMRS for the control channel is 1, the other resources are occupied by the service channel, and the number of the antenna ports corresponding to the DMRS for the service channel is 2. When it is defined that the same time-frequency-domain transmission resources are multiplexed by the DMRS for the service channel and the DMRS for the control channel in the case that the number of the antenna ports corresponding to the DMRS for the service channel is smaller than or equal to 1, the same time-frequency-domain transmission resources may be multiplexed by an antenna port 1 corresponding to the DMRS for the service channel and the DMRS for the control channel, and a portion of the DMRS for the service channel corresponding to an antenna port 2 and overlapping the frequency-domain resource corresponding to the DMRS for the control channel may be offset backward by one symbol. It should be appreciated that, each DMRS for the service channel corresponding to the antenna port 2 may be offset backward by one symbol. In this way, when a part of the time-frequency-domain resources are multiplexed by the DMRS for the downlink service channel and the DMRS for the control channel, and the other part of the time-frequency-domain resources is offset backward, it is able to improve the resource utilization as well as the downlink data transmission rate.

Further, Step 31 may include: configuring predetermined parameters of the DMRS for the service channel within the mini-slot; and transmitting the predetermined parameters of the DMRS for the service channel to the UE. The predetermined parameters may include at least one of configuration type information, frequency-domain density information, time-domain position information, and occupied-port information.

To be specific, the configuration type information of the DMRS may be used to indicate whether the DMRS pattern is of the configuration type 1 or the configuration type 2. The network device may transmit the configuration type information carried in a broadcast channel or Radio Resource Control (RRC) signaling to the UE. The frequency-domain density information of the DMRS may be used to indicate a frequency-domain density of the DMRS, i.e., a frequency-domain distribution of the DMRS, it mainly functions as to reduce the overhead for the DMRS. The network device may transmit the frequency-domain density information carried in the RRC signaling to the UE. The time-domain position information of the DMRS may be used to indicate a position of the time-domain symbol occupied by the DMRS. The network device may transmit the time-domain position information carried in the RRC signaling to the UE. The occupied-port information of the DMRS may be used to indicate a port or a port set occupied by the DMRS. The network device may transmit the occupied-port information carried in Downlink Control Information (DCI) to the UE.

According to the DMRS transmission method in the embodiment of the present disclosure, the network device may multiplex the DMRS for the service channel to the time-frequency-domain transmission resources corresponding to the DMRS for the control channel in the mini-slot transmission scenario, so it is able for the UE to measure a data channel in advance on the transmission resources for the control channel, thereby to effectively improve the data transmission rate.

The DMRS transmission method in different scenarios has been described hereinabove, and the corresponding network device will be described hereinafter in conjunction with the drawings.

Figure 7:
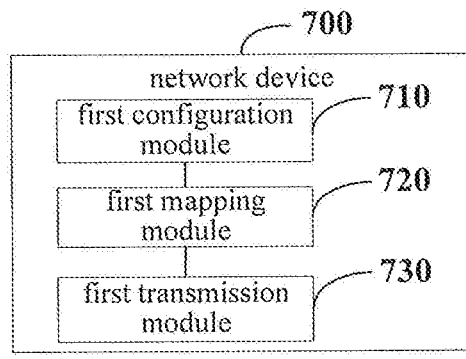
FIG. 7 is a block diagram showing a network device according to the first embodiment of the present disclosure.

As shown in FIG. 7, the present disclosure further provides in the first embodiment a network device 700 capable of configuring a DMRS for a service channel within a mini-slot, mapping at least one antenna port corresponding to the DMRS for the service channel to a time-domain transmission resource and a frequency-domain transmission resource corresponding to a DMRS for a control channel within the mini-slot, and transmitting or receiving the DMRS for the service channel on the time-domain transmission resource and the frequency-domain transmission resource, with a same technical effect. Specifically, the network device 700 may include: a first configuration module 710 configured to configure the DMRS for the service channel within the mini-slot; a first mapping module 720 configured to map at least one antenna port corresponding to the DMRS for the service channel to the time-domain transmission resource and the frequency-domain transmission resource corresponding to the DMRS for the control channel within the mini-slot; and a first transmission module 730 configured to transmit or receive the DMRS for the service channel on the time-domain transmission resource and the frequency-domain transmission resource.

The first mapping module 720 may include: a first mapping unit configured to, when the number of the antenna ports corresponding to the DMRS for the service channel is smaller than or equal to a predetermined value, map all the antenna ports corresponding to the DMRS for the service channel to the time-domain transmission resource and the frequency-domain transmission resource corresponding to the DMRS for the control channel.

The first mapping module 720 may further include: a second mapping unit configured to, when the number of the antenna ports corresponding to the DMRS for the service channel is greater than the predetermined value, map a first part of the antenna ports corresponding to the DMRS for the service channel to the time-domain transmission resource and the frequency-domain transmission resource corresponding to the DMRS for the control channel within the mini-slot; and a third mapping unit configured to map, to a transmission resource of M symbols being offset in time domain relative to the time-domain transmission resource corresponding to the control channel within the mini-slot, a second part of the antenna ports corresponding to the DMRS for the service channel, where M is an integer greater than or equal to 1.

The second part of the antenna ports is antenna ports corresponding to the DMRS for the service channel which overlap the frequency-domain transmission resource corresponding to the DMRS for the control channel, or antenna ports corresponding to the DMRS for the service channel whose number is greater than the predetermined value and which overlap the frequency-domain transmission resource corresponding to the DMRS for the control channel; and the first part of the antenna ports is all the antenna ports corresponding to the DMRS for the service channel other than the second part of the antenna ports.

The first configuration module 710 may include: a first configuration unit configured to configure predetermined parameters of the DMRS for the service channel within the mini-slot; and a transmission unit configured to transmit the predetermined parameters of the DMRS for the service channel to the UE. The predetermined parameters may include at least one of configuration type information, frequency-domain density information, time-domain position information, and occupied-port information.

The service channel may include a PUSCH or a PDSCH, and the control channel may include a PUCCH or a PDCCH.

It should be appreciated that, according to the network device in the first embodiment of the present disclosure, the network device may multiplex the DMRS for the service channel in the mini-slot to the time-frequency-domain transmission resources corresponding to the DMRS for the control channel in the mini-slot in the mini-slot transmission scenario, so it is able for the UE to measure a data channel in advance on the transmission resources for the control channel, thereby to effectively improve the data transmission rate.

Second Embodiment

Figure 8:
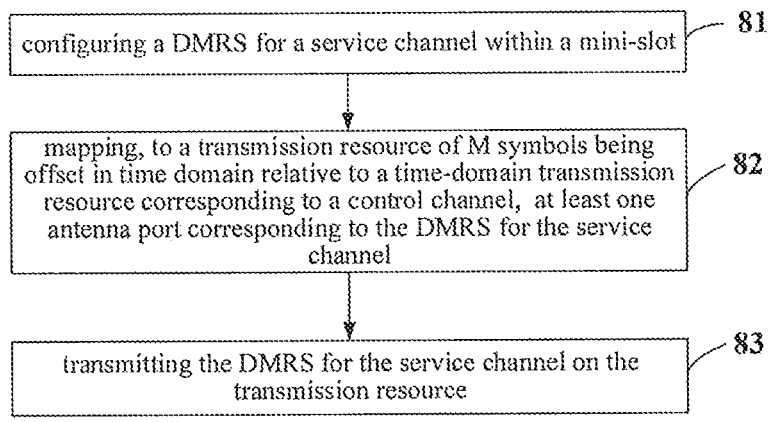
FIG. 8 is a flow chart of a DMRS transmission method according to a second embodiment of the present disclosure.

The present disclosure further provides in this embodiment a DMRS transmission method for a network device. As shown in FIG. 8, the DMRS transmission method includes Steps 81 to 83.

Step 81: configuring a DMRS for a service channel within a mini-slot.

In a mini-slot transmission scenario, a control channel and the service channel may occur on one or more time-domain symbols concurrently, and at this time, the network device needs to configure the DMRSs for the control channel and the service channel respectively.

Step 82: mapping, to a transmission resource of M symbols being offset in time domain relative to a time-domain transmission resource corresponding to a control channel within the mini-slot, at least one antenna port corresponding to the DMRS for the service channel.

Figure 9:
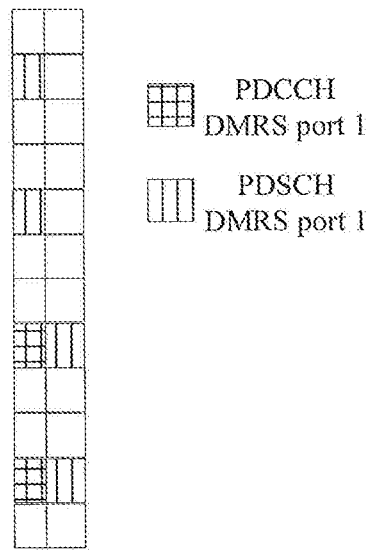
FIG. 9 is a schematic view showing the mapping of the resources multiplexed by the DMRS according to the second embodiment of the present disclosure.

M may be an integer greater than or equal to 1. To be specific, as shown in FIG. 9 (where each antenna port is mapped to the transmission resource of M symbols being offset in time domain relative to the time-domain transmission resource), it is presumed that two time-domain symbols are occupied by a downlink mini-slot, a part of resources of a first symbol (e.g., a low-frequency portion in the figure) are occupied by the control channel, the number of the antenna ports corresponding to the DMRS for the control channel is 1, the other resources are occupied by the service channel, and the number of the antenna ports corresponding to the DMRS for the service channel is 1. Optionally, a part of the DMRS for the service channel overlapping the frequency-domain resource corresponding to the DMRS for the control channel may be offset backward by one symbol. In this way, when a part of the DMRS for the service channel overlapping the frequency-domain resource corresponding to the DMRS for the control channel is offset backward, it is able to prevent the occurrence of the interference between the DMRS for the service channel and the DMRS for the control channel, thereby to improve a downlink data transmission rate.

The service channel may include a PUSCH or a PDSCH, and the control channel may include a PUCCH or a PDCCH.

Step 83: transmitting the DMRS for the service channel on the transmission resource.

The network device may multiplex a part of the antenna ports corresponding to the DMRS for the service channel not overlapping the DMRS for the control channel to the transmission resource corresponding to the DMRS for the control channel within the mini-slot, and the DMRS for the service channel overlapping the DMRS for the control channel may be offset by M time-domain symbols, i.e., the network device may transmit a part of the DMRS for the service channel through the control channel. As a result, it is able to improve the resource utilization as well as the downlink data transmission rate.

According to the DMRS transmission method in the second embodiment of the present disclosure, the network device may multiplex a part of the antenna ports corresponding to the DMRS for the service channel and not overlapping the DMRS for the control channel to the transmission resource for the control channel, so as to enable the service channel and the control channel to multiplex a part of the transmission resources, thereby to improve the resource utilization. In addition, it is able for the UE to measure a data channel in advance on the transmission resource for the control channel, thereby to effectively improve the data transmission rate.

The DMRS transmission method in different scenarios has been described hereinabove, and the corresponding network device will be described hereinafter in conjunction with the drawings.

Figure 10:
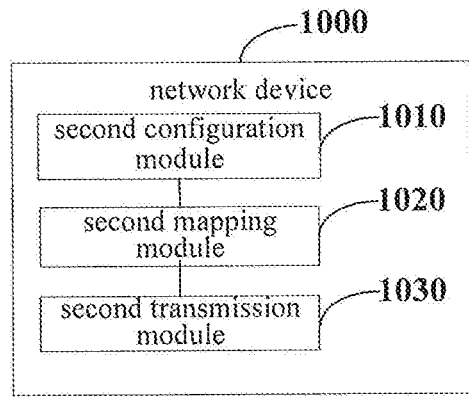
FIG. 10 is a block diagram showing the network device according to the second embodiment of the present disclosure.

As shown in FIG. 10, the present disclosure further provides in the first embodiment a network device 1000 capable of configuring a DMRS for a service channel within a mini-slot, mapping, to a transmission resource of M symbols being offset in time domain relative to a time-domain transmission resource corresponding to a control channel within the mini-slot, at least one antenna port corresponding to the DMRS for the service channel, M being an integer greater than or equal to 1, and transmitting the DMRS for the service channel on the transmission resource, with a same technical effect. Specifically, the network device 1000 may include: a second configuration module 1010 configured to configure the DMRS for the service channel within the mini-slot; a second mapping module 1020 configured to map, to the transmission resource of M symbols being offset in time domain relative to the time-domain transmission resource corresponding to the control channel within the mini-slot, at least one antenna port corresponding to the DMRS for the service channel, M being an integer greater than or equal to 1; and a second transmission module 1030 configured to transmit the DMRS for the service channel on the transmission resource.

The service channel may include a PUSCH or a PDSCH, and the control channel may include a PUCCH or a PDCCH.

According to the network device in the second embodiment of the present disclosure, the network device may multiplex a part of the antenna ports corresponding to the DMRS for the service channel and not overlapping the DMRS for the control channel to the transmission resource for the control channel, so as to enable the service channel and the control channel to multiplex a part of the transmission resources, thereby to improve the resource utilization. In addition, it is able for the UE to measure a data channel in advance on the transmission resource for the control channel, thereby to effectively improve the data transmission rate.

Third Embodiment

Figure 11:
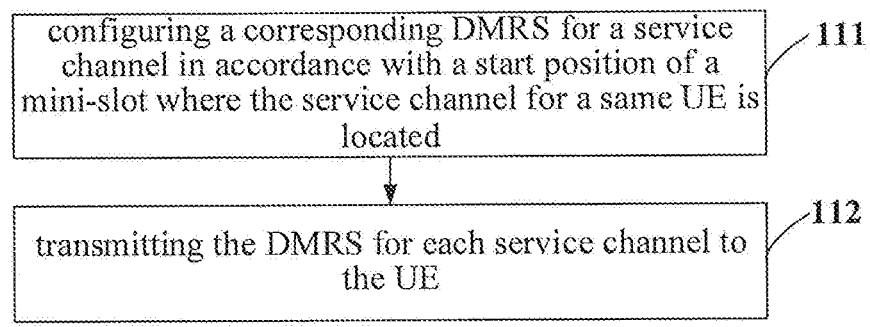
FIG. 11 is a flow chart of a DMRS transmission method according to a third embodiment of the present disclosure.

The present disclosure further provides in the third embodiment a DMRS transmission method for a network device. As shown in FIG. 11, the DMRS transmission method includes Steps 111 and 112.

Step 111: configuring a corresponding DMRS for a service channel in accordance with a start position of a mini-slot where the service channel for a same UE is located.

In an NR system, a normal slot (also called as slot) has a length of 7 or 14 time-domain symbols (also called OFDM symbols), and a slot having a length smaller than the normal slot may be called as short slot or mini-slot. The network device may concurrently configure slot-based transmission and mini-slot-based transmission for the same UE. At this time, it is necessary to configure the corresponding DMRS in accordance with the start transmission position of the mini-slot.

Step 112: transmitting the DMRS for each service channel to the UE.

After the DMRS for each service channel has been configured in the mini-slot transmission scenario, the network device may transmit the DMRS to the UE on the corresponding transmission resource, so that the UE may demodulate the service channel in accordance with the corresponding DMRS.

To be specific, when the mini-slot-based transmission and the slot-based transmission have been scheduled for one UE simultaneously, Step 111 may include: when a first time-domain symbol of the mini-slot, where the service channel for the same UE is located, is located before a first time-domain symbol of a front-loaded DMRS within a normal slot, separately configuring the DMRS within the mini-slot where the service channel is located, and the front-loaded DMRS and/or an additional DMRS within the normal slot. In other words, when the first symbol of the mini-slot is located before a first symbol of the front-loaded DMRS within the slot and no DMRS is transmitted before the first symbol of the mini-slot, the network device may configure a separate DMRS for the service channel within the mini-slot, and further configure the front-loaded DMRS and the additional DMRS within the slot.

Further, Step 111 may further include, when the first time-domain symbol of the mini-slot where the service channel for the same UE is located is located on a time-domain symbol of the front-loaded DMRS or the additional DMRS within the normal slot, separately configuring the DMRS within the mini-slot where the service channel is located, and the front-loaded DMRS and/or the additional DMRS within the normal slot. In other words, when the first symbol of the mini-slot is located on the symbol occupied by the front-loaded DMRS or the additional DMRS within the slot, a service transmitted within the mini-slot has a relatively higher priority level, so it is still necessary for the network device to separately configure the DMRS within the mini-slot, although the front-loaded DMRS and/or the additional DMRS within the slot have been configured by the network device.

Alternatively, Step 111 may further include, when the first time-domain symbol of the mini-slot where the service channel for the same UE is located is located on a time-domain symbol of the front-loaded DMRS or the additional DMRS within the normal slot, not configuring the configuration of the front-loaded DMRS or the additional DMRS within the normal slot, and configuring the DMRS within the mini-slot where the service channel is located. In other words, when the first symbol of the mini-slot is located on the symbol occupied by the front-loaded DMRS or the additional DMRS within the slot, because the service transmitted within the mini-slot has a relatively higher priority level, the configuration of the front-loaded DMRS or the additional DMRS within the slot may be not configured and the DMRS within the mini-slot may be configured, so as to prevent the interference caused by the front-loaded DMRS or the additional DMRS within the slot on the DMRS within the mini-slot.

Alternatively, Step 111 may further include, when the first time-domain symbol of the mini-slot where the service channel for the same UE is located is located on a time-domain symbol of the front-loaded DMRS or the additional DMRS within the normal slot, configuring the front-loaded DMRS and/or the additional DMRS within the normal slot, and determining the front-loaded DMRS and/or the additional DMRS as the DMRS within the mini-slot where the service channel is located. In other words, when the first symbol of the mini-slot is located on the symbol occupied by the front-loaded DMRS or the additional DMRS within the slot, because the network device is currently configuring or has configured the front-loaded DMRS and/or the additional DMRS within the slot, the front-loaded DMRS and/or the additional DMRS may be directly determined as the DMRS within the mini-slot, so as to reduce the transmission resources.

Step 111 may further include, when the first time-domain symbol of the mini-slot where the service channel for the same UE is located is located after the time-domain symbol of the front-loaded DMRS and/or the additional DMRS within the normal slot, separately configuring the DMRS within the mini-slot where the service channel is located, and the front-loaded DMRS and/or the additional DMRS within the normal slot. In other words, when the first symbol of the mini-slot is located after the time-domain symbol of the front-loaded DMRS and/or the additional DMRS within the slot, it is still necessary to separately configure the DMRS within the mini-slot, although the network device has configured the front-loaded DMRS and/or the additional DMRS within the slot.

Alternatively, Step 111 may further include, when the first time-domain symbol of the mini-slot where the service channel for the same UE is located is located after the time-domain symbol of the front-loaded DMRS and/or the additional DMRS within the normal slot, configuring the front-loaded DMRS and/or the additional DMRS within the normal slot, and determining the front-loaded DMRS and/or the additional DMRS as the DMRS within the mini-slot where the service channel is located. In other words, when the first symbol of the mini-slot is located after the time-domain symbol of the front-loaded DMRS and/or the additional DMRS within the slot, because the network device has configured the front-loaded DMRS and/or the additional DMRS within the slot, the front-loaded DMRS and/or the additional DMRS may be directly determined as the DMRS within the mini-slot, so as to reduce the transmission resources.

According to the DMRS transmission method in the embodiment of the present disclosure, when the slot-based transmission and the mini-slot-based transmission have been scheduled by the network device simultaneously, the network device may configure the corresponding DMRS at the start position of the mini-slot. Different DMRSs may be configured depending on different start positions of the mini-slot. This configuration mode is flexible, so it is able to flexibly configure the resources while ensuring the accurate demodulation of the channel and the normal data transmission, thereby to maximize the resource utilization.

The DMRS transmission method in different scenarios has been described hereinabove, and the corresponding network device will be described hereinafter in conjunction with the drawings.

Figure 12:
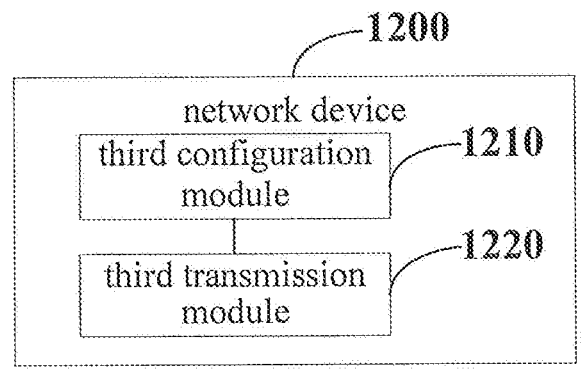
FIG. 12 is a block diagram showing the network device according to the third embodiment of the present disclosure.

As shown in FIG. 12, the present disclosure further provides in the embodiment a network device 1200 capable of configuring a corresponding DMRS for a service channel in accordance with a start position of a mini-slot where the service channel for a same UE is located, and transmit the DMRS for the service cannel to the UE, with a same technical effect. Specifically, the network device 1200 may include: a third configuration module 1210 configured to configure the corresponding DMRS for the service channel in accordance with the start position of the mini-slot where the service channel for the same UE is located; and a third transmission module 1220 configured to transmit the DMRS for the service channel to the UE.

The third configuration module 1210 may include: a first configuration sub-module configured to, when a first time-domain symbol of the mini-slot where the service channel for the same UE is located is located before a first time-domain symbol of a front-loaded DMRS within a normal slot, separately configure the DMRS within the mini-slot where the service channel is located, and the front-loaded DMRS and/or an additional DMRS within the normal slot.

The third configuration module 1210 may include: a second configuration sub-module configured to, when the first time-domain symbol of the mini-slot where the service channel for the same UE is located is located on a time-domain symbol of the front-loaded DMRS or the additional DMRS within the normal slot, separately configure the DMRS within the mini-slot where the service channel is located, and the front-loaded DMRS and/or the additional DMRS within the normal slot; or a third configuration sub-module configured to, when the first time-domain symbol of the mini-slot where the service channel for the same UE is located is located on a time-domain symbol of the front-loaded DMRS or the additional DMRS within the normal slot, not configure the configuration of the front-loaded DMRS or the additional DMRS within the normal slot, and configure the DMRS within the mini-slot where the service channel is located; or a fourth configuration sub-module configured to, when the first time-domain symbol of the mini-slot where the service channel for the same UE is located is located on a time-domain symbol of the front-loaded DMRS or the additional DMRS within the normal slot, configure the front-loaded DMRS and/or the additional DMRS within the normal slot, and determine the front-loaded DMRS and/or the additional DMRS as the DMRS within the mini-slot where the service channel is located.

The third configuration module 1210 may further include: a fifth configuration sub-module configured to, when the first time-domain symbol of the mini-slot where the service channel for the same UE is located is located after the time-domain symbol of the front-loaded DMRS and/or the additional DMRS within the normal slot, separately configure the DMRS within the mini-slot where the service channel is located, and the front-loaded DMRS and/or the additional DMRS within the normal slot; or a sixth configuration sub-module configured to, when the first time-domain symbol of the mini-slot where the service channel for the same UE is located is located after the time-domain symbol of the front-loaded DMRS and/or the additional DMRS within the normal slot, configure the front-loaded DMRS and/or the additional DMRS within the normal slot, and determine the front-loaded DMRS and/or the additional DMRS as the DMRS within the mini-slot where the service channel is located.

According to the network device in the embodiment of the present disclosure, when the slot-based transmission and the mini-slot-based transmission have been scheduled simultaneously, the network device may configure the corresponding DMRS at the start position of the mini-slot. Different DMRSs may be configured depending on different start positions of the mini-slot. This configuration mode is flexible, so it is able to flexibly configure the resources while ensuring the accurate demodulation of the channel and the normal data transmission, thereby to maximize the resource utilization.

In order to achieve the above purposes in a better manner, the present disclosure further provides in some embodiments a network device which includes a processor, a memory, and a program being stored in the memory and capable of being executed by the processor. The processor is configured to execute the program so as to implement the above-mentioned DMRS transmission method. The present disclosure further provides in some embodiments a computer-readable storage medium storing therein a program. The program is executed by a processor so as to implement the above-mentioned DMRS transmission method.

Figure 13:
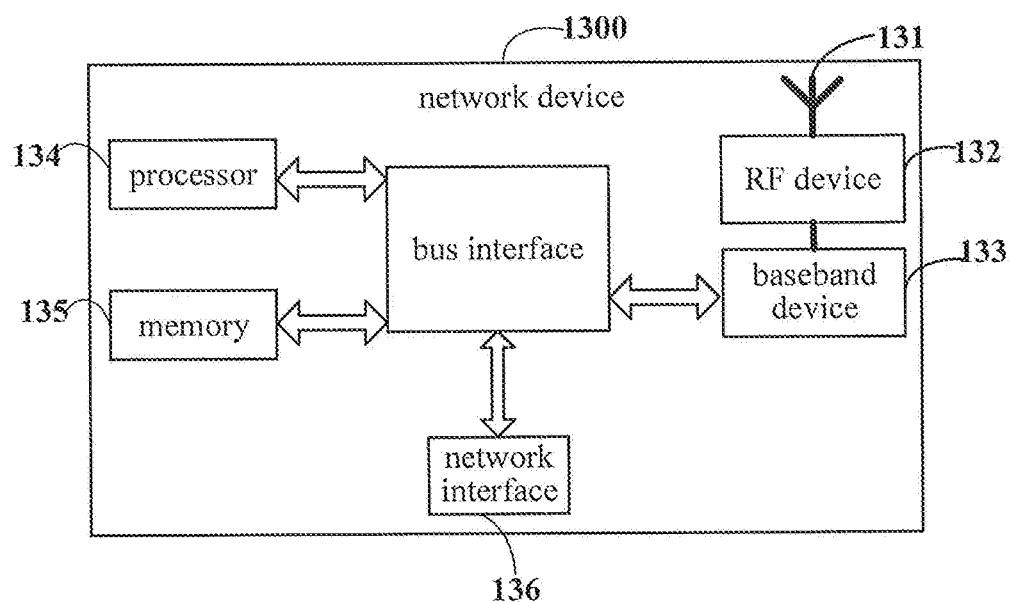
FIG. 13 is a block diagram of the network device according to an embodiment of the present disclosure.

The present disclosure further provides in some embodiments a network device 1300 which, as shown in FIG. 13, includes an antenna 131, a Radio Frequency (RF) device 132, and a baseband device 133. The antenna 131 is connected to the RF device 132. In an uplink direction, the RF device 132 is configured to receive information via the antenna 131, and transmit the received information to the baseband device 133 for processing. In a downlink direction, the baseband device 133 is configured to process to-be-transmitted information, and transmit the processed information to the RF device 132. The RF device 132 is configured to process the received information and transmit the processed information via the antenna 131.

A frequency band processing unit may be located within the baseband device 133, so that the above method for the network device of the above embodiment may be implemented within the baseband device 133. The baseband device 133 may include a processor 134 and a memory 135.

The baseband device 133 may, e.g., include at least one baseband board on which a plurality of chips is located, as shown in FIG. 13. One chip may be, e.g., the processor 134 connected to the memory 135 and configured to call a program stored in the memory 135 so as to perform operations for the network device in the above-mentioned method embodiments.

The baseband device 133 may further include a network interface 136 configured to exchange information with the RF device 132. The network interface may be, e.g., a Common Public Radio Interface (CPRI).

Here, the processor may include merely one processor, or a plurality of processing elements. For example, the processor may be a Central Processing Unit (CPU), an Application Specific Integrated Circuit (ASIC), or one or more Integrated Circuits (ICs) configured to implement the above-mentioned method for the network device, e.g., one or more Digital Signal Processors (DSPs), or one or more Field Programmable Gate Arrays (FPGAs). The memory may include merely one memory, or a plurality of storage elements.

It should be appreciated that, the memory 135 may be a volatile memory, a nonvolatile memory or both. The non-volatile memory may be a Read-Only Memory (ROM), a Programmable ROM (PROM), an Erasable PROM (EPROM), an Electrically EPROM (EEPROM) or a flash memory. The volatile memory may be a Random Access Memory (RAM) which serves as an external high-speed cache. Illustratively but nonrestrictively, the RAM may be in various forms, e.g., Static RAM (SRAM), Dynamic RAM (DRAM), Synchronous DRAM (SDRAM), Double Data Rate SDRAM (DDRSDRAM), Enhanced SDRAM (ESDRAM), Synchlink DRAM (SLDRAM) or Direct Rambus RAM (DRRAM). The memory 135 intends to include, but not limited to, the above-mentioned and any other appropriate memories.

To be specific, in some embodiments of the present disclosure, the network device may further include a computer program stored in the memory 135 and executed by the processor 134. The processor 134 is configured to call the computer program in the memory 135 so as to implement the method executed by the modules in FIG. 7.

To be specific, the processor 134 is configured to call the computer program, so as to: configure a DMRS for a service channel within a mini-slot; map at least one antenna port corresponding to the DMRS for the service channel to a time-domain transmission resource and a frequency-domain transmission resource corresponding to a DMRS for a control channel within the mini-slot; and transmit or receive the DMRS for the service channel on the time-domain transmission resource and the frequency-domain transmission resource.

To be specific, the processor 134 is configured to call the computer program, so as to, when the number of the antenna ports corresponding to the DMRS for the service channel is smaller than or equal to a predetermined value, map all the antenna ports corresponding to the DMRS for the service channel to the time-domain transmission resource and the frequency-domain transmission resource corresponding to the DMRS for the control channel within the mini-slot.

To be specific, the processor 134 is configured to call the computer program, so as to: when the number of the antenna ports corresponding to the DMRS for the service channel is greater than the predetermined value, map a first part of the antenna ports corresponding to the DMRS for the service channel to the time-domain transmission resource and the frequency-domain transmission resource corresponding to the DMRS for the control channel within the mini-slot; and map, to a transmission resource of M symbols being offset in time domain relative to the time-domain transmission resource corresponding to the control channel within the mini-slot, a second part of the antenna ports corresponding to the DMRS for the service channel, where M is an integer greater than or equal to 1.

The second part of the antenna ports may include antenna ports corresponding to the DMRS for the service channel and overlapping the frequency-domain transmission resource corresponding to the DMRS for the control channel, or antenna ports corresponding to the DMRS for the service channel whose number is greater than the predetermined value. The first part of the antenna ports may include all the antenna ports corresponding to the DMRS for the service channel other than the second part of the antenna ports.

To be specific, the processor 134 is configured to call the computer program, so as to: configure predetermined parameters of the DMRS for the service channel within the mini-slot; and transmit the predetermined parameters of the DMRS for the service channel to the UE. The predetermined parameters may include at least one of configuration type information, frequency-domain density information, time-domain position information, and occupied-port information.

To be specific, the service channel may include a PUSCH or a PDSCH, and the control channel may include a PUCCH or a PDCCH.

According to the network device in the embodiments of the present disclosure, the network device may multiplex the DMRS for the service channel to the time-frequency-domain transmission resources corresponding to the DMRS for the control channel in the mini-slot transmission scenario, so it is able for the UE to measure a data channel in advance on the transmission resources for the control channel, thereby to effectively improve the data transmission rate.

The processor 134 is further configured to call the computer program stored in the memory 135, so as to implement the method executed by the modules in FIG. 10.

To be specific, the processor 134 is configured to call the computer program, so as to: configure a DMRS for a service channel within a mini-slot; map, to a transmission resource of M symbols being offset in time domain relative to a time-domain transmission resource corresponding to a control channel within the mini-slot, at least one antenna port corresponding to the DMRS for the service channel, M being an integer greater than or equal to 1; and transmit the DMRS for the service channel on the transmission resource.

To be specific, the service channel may include a PUSCH or a PDSCH, and the control channel may include a PUCCH or a PDCCH.

According to the network device in the embodiments of the present disclosure, the network device may multiplex a part of the antenna ports corresponding to the DMRS for the service channel and not overlapping the DMRS for the control channel to the transmission resource for the control channel, so as to enable the service channel and the control channel to multiplex a part of the transmission resources, thereby to improve the resource utilization. In addition, it is able for the UE to measure a data channel in advance on the transmission resource for the control channel, thereby to effectively improve the data transmission rate.

The processor 134 is further configured to call the computer program stored in the memory 135, so as to implement the method executed by the modules in FIG. 12.

To be specific, the processor 134 is configured to call the computer program, so as to: configure a corresponding DMRS for a service channel in accordance with a start position of a mini-slot where the service channel for a same UE is located; and transmit the DMRS for the service channel to the UE.

To be specific, the processor 134 is configured to call the computer program, so as to, when a first time-domain symbol of the mini-slot where the service channel for the same UE is located is located before a first time-domain symbol of a front-loaded DMRS within a normal slot, separately configure the DMRS within the mini-slot where the service channel is located, and the front-loaded DMRS and/or an additional DMRS within the normal slot.

To be specific, the processor 134 is configured to call the computer program, so as to: when the first time-domain symbol of the mini-slot where the service channel for the same UE is located is located on a time-domain symbol of the front-loaded DMRS or the additional DMRS within the normal slot, separately configure the DMRS within the mini-slot where the service channel is located, and the front-loaded DMRS and/or the additional DMRS within the normal slot; or when the first time-domain symbol of the mini-slot where the service channel for the same UE is located is located on a time-domain symbol of the front-loaded DMRS or the additional DMRS within the normal slot, not configure the configuration of the front-loaded DMRS or the additional DMRS within the normal slot, and configure the DMRS within the mini-slot where the service channel is located; or when the first time-domain symbol of the mini-slot where the service channel for the same UE is located is located on a time-domain symbol of the front-loaded DMRS or the additional DMRS within the normal slot, configure the front-loaded DMRS and/or the additional DMRS within the normal slot, and determine the front-loaded DMRS and/or the additional DMRS as the DMRS within the mini-slot where the service channel is located.

To be specific, the processor 134 is configured to call the computer program, so as to: when the first time-domain symbol of the mini-slot where the service channel for the same UE is located is located after the time-domain symbol of the front-loaded DMRS and/or the additional DMRS within the normal slot, separately configure the DMRS within the mini-slot where the service channel is located, and the front-loaded DMRS and/or the additional DMRS within the normal slot; or when the first time-domain symbol of the mini-slot where the service channel for the same UE is located is located after the time-domain symbol of the front-loaded DMRS and/or the additional DMRS within the normal slot, configure the front-loaded DMRS and/or the additional DMRS within the normal slot, and determine the front-loaded DMRS and/or the additional DMRS as the DMRS within the mini-slot where the service channel is located.

The network device may be a Base Transceiver Station (BTS) in a Global System of Mobile communication (GSM) system or a Code Division Multiple Access (CDMA) system, a Node B (NB) in a Wideband Code Division Multiple Access (WCDMA) system, an evolved Node B (eNB, or eNodeB), a relay or an access point in a Long Term Evolution (LTE) system, or a base station in a coming 5G network, which will not be particularly defined herein.

According to the network device in the embodiments of the present disclosure, when the slot-based transmission and the mini-slot-based transmission have been scheduled simultaneously, the network device may configure the corresponding DMRS at the start position of the mini-slot. Different DMRSs may be configured depending on different start positions of the mini-slot. This configuration mode is flexible, so it is able to flexibly configure the resources while ensuring the accurate demodulation of the channel and the normal data transmission, thereby to maximize the resource utilization.

It should be appreciated that, units and algorithm steps described in the embodiments of the present disclosure may be implemented in the form of electronic hardware, or a combination of a computer software and the electronic hardware. Whether these functions are executed by hardware or software depends on specific applications or design constraints of the technical solution. Different methods may be adopted by a person skilled in the art with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the device is merely for illustrative purposes, and the units are provided merely on the basis of their logic functions. During the actual application, the units may be provided in other manners, for example, some components or units may be combined together or integrated into another system. Alternatively, some functions of the components or units may be omitted or not executed. In addition, the coupling connection, direct coupling connection or communication connection between the components or units may be implemented via interfaces, and the indirect coupling connection or communication connection between the devices or units may be implemented in an electrical or mechanical form or in any other form.

The units may be, or may not be, physically separated from each other. The shown units may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, parts of the technical solutions of the present disclosure contributing to the related art, or parts of the technical solutions may appear in the form of software products, which may be stored in a storage medium and include instructions so as to enable computer equipment (e.g., a personal computer, a server or network equipment) to execute all or parts of the steps of the method according to the embodiments of the present disclosure. The storage medium includes any medium capable of storing therein program codes, e.g., a Universal Serial Bus (USB) flash disk, a mobile Hard Disk (HD), a Read-Only Memory (ROM), a Random Access Memory (RAM), a magnetic disk or an optical disk.

It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order, but the present disclosure is not limited thereto. Some steps may also be performed in parallel, or independently of each other. It should be further appreciated that, after reading the descriptions of the present disclosure, it is able a person skilled in the art to understand all or any of steps or elements of the methods and the devices in the embodiments of the present disclosure, it is able for a person skilled in the art, using a basic programming skill, to implement any or all steps of the method and any or all members of the device in any computing device (including a processor and a storage medium) or a network consisting of the computing devices, in the form of hardware, firmware, software or a combination thereof.

Hence, the purposes of the present disclosure may also be implemented by one program or a set of programs running on any computing device, e.g., a known general-purpose device, or implemented merely by a program product including programs codes capable of implementing the method or device. In other words, this program product and a storage medium storing therein the program product also constitute a part of the present disclosure. Obviously, the storage medium may be any known storage medium or a storage medium that may be developed in future. It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order, but the present disclosure is not limited thereto. Some steps may also be performed in parallel, or independently of each other.

The above embodiments are optional embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A DMRS transmission method for a network device, comprising:
configuring a DMRS for a service channel within a mini-slot; in a mini-slot transmission scenario, when a control channel and the service channel occur in at least one time-domain symbol concurrently, mapping, to a transmission resource of M symbols being offset in time domain relative to a time-domain transmission resource corresponding to a control channel within the mini-slot, all antenna ports corresponding to the DMRS for the service channel, wherein the DMRS for the service channel occupies two symbols, and M is an integer greater than or equal to 1; and
transmitting the DMRS for the service channel on the transmission resource.

2. The DMRS transmission method according to claim 1, wherein the service channel comprises a PUSCH or a PDSCH, and the control channel comprises a PUCCH or a PDCCH.

3. The DMRS transmission method according to claim 1, wherein a duration of the mini-slot is less than 14 symbols in time domain.

4. The DMRS transmission method according to claim 1, wherein mapping, to the transmission resource of M symbols being offset in time domain relative to the time-domain transmission resource corresponding to the control channel within the mini-slot, the DMRS for the service channel comprises,
if the service channel and the control channel occur at least in one symbol in time domain, mapping, to the transmission resource of M symbols being offset in time domain relative to the time-domain transmission resource corresponding to the control channel within the mini-slot, the DMRS for the service channel.

5. A network device, comprising a processor, a memory, and a program being stored in the memory and capable of being executed by the processor, wherein the processor is configured to execute the program to implement steps of:
configuring a DMRS for a service channel within a mini-slot; in a mini-slot transmission scenario, when a control channel and the service channel occur in at least one time-domain symbol concurrently, mapping, to a transmission resource of M symbols being offset in time domain relative to a time-domain transmission resource corresponding to a control channel within the mini-slot, -all antenna ports corresponding to the DMRS for the service channel, wherein the DMRS for the service channel occupies two symbols, and M is an integer greater than or equal to 1; and transmitting the DMRS for the service channel on the transmission resource.

6. The network device according to claim 5, wherein a duration of the mini-slot is less than 14 symbols in time domain.

7. The network device according to claim 5, wherein the processor is further configured to execute the program to:
if the service channel and the control channel occur at least in one symbol in time domain, map, to the transmission resource of M symbols being offset in time domain relative to the time-domain transmission resource corresponding to the control channel within the mini-slot, the DMRS for the service channel.

8. The network device according to claim 5, wherein the service channel comprises a PUSCH or a PDSCH, and the control channel comprises a PUCCH or a PDCCH.

9. A computer-readable storage medium storing therein a program, wherein the program is configured to be executed by a processor to implement steps of:
configuring a DMRS for a service channel within a mini-slot;

in a mini-slot transmission scenario, when a control channel and the service channel occur in at least one time-domain symbol concurrently, mapping, to a transmission resource of M symbols being offset in time domain relative to a time-domain transmission resource corresponding to a control channel within the mini-slot, all antenna ports corresponding to the DMRS for the service channel, wherein the DMRS for the service channel occupies two symbols, and M is an integer greater than or equal to 1; and transmitting the DMRS for the service channel on the transmission resource.

10. The computer-readable storage medium according to claim 9, wherein the service channel comprises a PUSCH or a PDSCH, and the control channel comprises a PUCCH or a PDCCH.

11. The computer-readable storage medium according to claim 9, wherein a duration of the mini-slot is less than 14 symbols in time domain.

12. The computer-readable storage medium according to claim 9, wherein mapping, to the transmission resource of M symbols being offset in time domain relative to the time-domain transmission resource corresponding to the control channel within the mini-slot, the DMRS for the service channel comprises, if the service channel and the control channel occur at least in one symbol in time domain, mapping, to the transmission resource of M symbols being offset in time domain relative to the time-domain transmission resource corresponding to the control channel within the mini-slot, the DMRS for the service channel.

* * * * *